United States Patent [19]
Lange et al.

[11] Patent Number: 6,166,124
[45] Date of Patent: Dec. 26, 2000

[54] CATIONIC LAMINAR COMPOUNDS AND THEIR PRODUCTION AND USE AS STABILIZERS FOR HALOGEN CONTAINING PLASTICS

[75] Inventors: Ilona Lange, Langenfeld; Joerg-Dieter Klamann, Bremerhaven; Juergen Foell, Duesseldorf; Peter Wedl, Bremerhaven; Dieter Marks, Loxstedt, all of Germany

[73] Assignee: Cognis Deutschland GmbH, Duesseldorf, Germany

[21] Appl. No.: 09/180,049

[22] PCT Filed: Apr. 21, 1997

[86] PCT No.: PCT/EP97/01992

§ 371 Date: Feb. 4, 1999

§ 102(e) Date: Feb. 4, 1999

[87] PCT Pub. No.: WO97/41062

PCT Pub. Date: Nov. 6, 1997

[30] Foreign Application Priority Data

Apr. 29, 1996 [DE] Germany ............ 196 17 138

[51] Int. Cl.⁷ ................................................ C08K 3/00
[52] U.S. Cl. ............... 524/451; 524/436; 524/437; 524/176; 524/174; 524/567
[58] Field of Search ............................. 524/567, 436, 524/437, 176, 174, 451

[56] References Cited

U.S. PATENT DOCUMENTS

| | | | |
|---|---|---|---|
| 3,650,704 | 3/1972 | Kumura et al. | 423/415.1 |
| 4,299,759 | 11/1981 | Miyata et al. | 260/45.7 R |
| 4,444,417 | 5/1984 | Spickett et al. | 424/156 |
| 4,539,195 | 9/1985 | Schanz et al. | 423/419 P |
| 4,560,545 | 12/1985 | Spickett et al. | 423/430 |
| 4,656,156 | 4/1987 | Misra | 502/415 |
| 5,073,584 | 12/1991 | Meszaros et al. | 524/101 |
| 5,106,898 | 4/1992 | Nosu et al. | 524/313 |
| 5,416,135 | 5/1995 | Endres et al. | 523/205 |
| 5,416,141 | 5/1995 | Endres et al. | 524/109 |
| 5,539,135 | 7/1996 | Breuer et al. | 554/167 |

FOREIGN PATENT DOCUMENTS

| | | |
|---|---|---|
| 932121 | 8/1973 | Canada . |
| 0 189 899 | 8/1986 | European Pat. Off. . |
| 0 377 428 | 7/1990 | European Pat. Off. . |
| 15 92 126 | 10/1970 | Germany . |
| 20 61 114 | 7/1971 | Germany . |
| 29 05 256 | 8/1979 | Germany . |
| 30 19 632 | 11/1981 | Germany . |
| 33 06 822 | 8/1984 | Germany . |
| 44 25 266 | 10/1995 | Germany . |
| 4425266C | 10/1995 | Germany . |
| 44 25 275 | 1/1996 | Germany . |
| 1 185 920 | 3/1970 | United Kingdom . |
| WO92/06135 | 4/1992 | WIPO . |
| WO92/17405 | 10/1992 | WIPO . |
| WO92/20619 | 11/1992 | WIPO . |
| WO92/20732 | 11/1992 | WIPO . |
| WO95/21127 | 8/1995 | WIPO . |

OTHER PUBLICATIONS

W.T. Reichle, "Anionic clay minerals", Chemtec (Jan. 1986) pp. 58–63.

Roempps Chemix–Lexikon (1973) p. 1539.

Kirk–Othmer, "Encyclopedia of Chemical Technology", vol. 7, 3rd ED. (1979) pp. 840–841.

Ullmann's ,"Encyclopedia of Industrial Chemistry", vol. A8, 5th Ed. (1987) pp. 586–601).

Ullman's ,Encyclopaedie der technischen Chemie, vol. 19, 4th Ed. (1980) pp. 2–11.

Ullmann's ,Encyclopaedie der technischen Chemie, vol. 16, 4th ED. (1978) pp. 254–257.

DIN 5033.

*Primary Examiner*—Robert Dawson
*Assistant Examiner*—Kuo-Liang Peng
*Attorney, Agent, or Firm*—John E. Drach; Real J. Grandmaison; Aaron R. Ettelman

[57] ABSTRACT

A process for the production of cationic layer compounds wherein layer compounds corresponding to general formula (I):

$$[E_e Z_z D_d V_v (OH^-)_x](A^{n-})_a \cdot qH_2O \qquad (I)$$

in which

E is a monovalent cation from the group consisting of alkali metals, e is a number of 0 to 2, Z is a divalent metal cation, z is a number of 0 to 6, D is a trivalent metal cation, d is a number of 0 to 3, V is a tetravalent metal cation, v is a number of 0 to 1, $(A^{n-})$ is an acid anion having the charge n– where n is an integer of 1 to 3, q is a number of 1 to 10, with the proviso that x>a and e+2z+3d+4v=x+na, are subjected to alkali-induced ripening in aqueous medium wherein the alkali metal hydroxide content of said aqueous medium is adjusted to a value in the 1- to 6-molar range, the crystallization temperature is adjusted to a value in the range from 60° C. to 100° C., and the crystallization time is adjusted to a value in the range from 2.5 to 50 hours.

19 Claims, No Drawings

CATIONIC LAMINAR COMPOUNDS AND THEIR PRODUCTION AND USE AS STABILIZERS FOR HALOGEN CONTAINING PLASTICS

BACKGROUND OF THE INVENTION

1. Field of the Invention

This invention relates to special cationic layer compounds of the hydrotalcite type, to a process for their production and to their use as stabilizers for halogen-containing plastics.

It is known that halogen-containing plastics or molding compounds produced from them tend to degrade or decompose on exposure to heat or high-energy radiation, for example ultraviolet light. To counteract this, they are normally treated with heavy metal compounds based, for example, on lead, barium and/or cadmium. For reasons of factory hygiene, however, there is a need to replace these thoroughly effective stabilizers by less health-damaging materials. Possible alternative stabilizers to the heavy metal compounds are, for example calcium and zinc soaps, but unfortunately they do not perform as well as the heavy metal compounds mentioned above so that co-stabilizers have to be used in order to enhance their stabilizing effect.

2. Discussion of Related Art

German patent DE-C-30 19 632 (Kyowa Chemical Ind.) describes the use of hydrotalcites for inhibiting the thermal or ultraviolet degradation of halogen-containing thermoplastic resins. This patent specification discloses test results which show that, when readily commercially available hydrotal-cites are incorporated, for example, in vinyl chloride resins, they accelerate the dechlorination of the resins on heating or even cause decomposition, blackening or foaming of the resins. In addition, it was found that these hydrotalcites show poor dispersibility in the resins and adversely affect the rheological properties of the resins during molding and also the appearance of the molded products obtained. These test results are attributed to the small crystal size of the usual hydrotalcites and to the large specific BET surface of at least about 50 m²/g and the coverage of the hydrotalcite particles with water. Accordingly, it is proposed in German patent DE-C-30 19 632 to use hydrotalcites which have a large crystal size and a specific BET surface of no larger than 30 m²/g and which may optionally be coated with an anionic surfactant, such as sodium stearate.

European patent application EP-A-189 899 (Kyowa Chemical Ind.) also describes resin compositions containing hydrotalcites having specific BET surfaces below 30 m²/g. It is known from this European patent application that the hydrotalcites can be modified with higher fatty acid esters, anionic surfactants and coupling agents of the silane or titanium type in order to improve the compatibility of the hydrotalcite with the resins. According to cited European patent application EP-A-1 89 899, the hydrotalcites are said to be modified by mechanical mixing with the modifying agents in pure or dissolved form.

DEC-33 06 822 (Giulini Chemie) teaches that hydrotalcites with the formula $[Mg_6Al_2(OH)_{12}](CO_3)_2 \cdot xH_2O$ (with $x \geq 2$) are obtained by reaction of aluminium hydroxide with magnesium hydroxide or magnesium oxide in the presence of basic magnesium carbonate as carbonate ion donor at a temperature of 50 to 100° C. and subsequent spray drying from the suspension. The aluminium hydroxide is used in particular in the form of "active" aluminium hydroxide.

U.S. Pat. No. 4,656,156 (Aluminium Company of America) describes a process for producing hydrotalcite in which the aluminate liquor of the Bayer process is used as the aluminium component. The Bayer liquor is reacted with "active" magnesium oxide which can be obtained, for example, by calcining magnesium carbonate. This process can only be economically used in places where the Bayer liquor itself accumulates because otherwise relatively large quantities of water would again have to be transported.

DE-A-15 92 126 (Kyowa Chemical Ind.) describes the production of hydrotalcites from different starting materials, for example from a suspension of solid aluminium hydroxide, solid magnesium hydroxide and sodium hydrogen carbonate. The reactions are carried out in batches and the products are separated from the water phase by filtration or centrifugation and washed before they are dried.

According to DE-C-44 25 266 (Metaligesellschaft AG), the familiar subject of stabilizing halogen-containing plastics is outlined as follows: halogen-containing thermoplastic resins, such as polyvinyl chloride, are converted during processing (melt forming) into polyene structures with elimination of hydrogen chloride (HCl). The polymer becomes discolored. In order to improve thermal stability, metal carboxylates ("metal soaps") are normally incorporated in the resin as stabilizers. However, since the incorporation of such substances as sole stabilizers can lead to so-called metal burning in the event of relatively prolonged melt forming processes, resulting in blackening of the polymer, it is standard practice to add a co-stabilizer. Typical co-stabilizers are, for example, polyols, organic phosphorous acid esters or epoxy compounds. According to the teaching of DE-C-44 25 266, special lithium-ontaining layer lattice compounds can be used for stabilizing PVC in particular. In addition, DE-A-44 25 275 (Metaligesell-schaft AG) also teaches the use of similar Li-containing layer lattice compounds for stabilizing halogen-containing plastics.

DESCRIPTION OF THE INVENTION

The problem addressed by the present invention was to provide stabilizers for halogen-containing plastics which would be distinguished by an improved action profile in relation to the prior art. In particular, they would have the following properties:

Compatibility with calcium and/or zinc compounds.

Dispersibility in halogen-containing plastics without adversely affecting their rheological properties.

Pronounced ability to effectively trap the decomposition products of halogen-containing plastics. This would mean above all improved properties in regard to their ability to absorb hydrogen chloride.

Improvement in the long-term stability of halogen-containing plastics, particularly PVC (polyvinyl chloride).

The present invention relates first to a process for the production of cationic layer compounds in which layer compounds corresponding to general formula (I):

$$[E_eZ_zD_dV_v(OH^-)_x](A^{n-})_a \cdot qH_2O \qquad (I)$$

in which

E is a monovalent cation from the group of alkali metals, e is a number of 0 to 2, Z is a divalent metal cation, z is a number of 0 to 6, D is a trivalent metal cation, d is a number of 0 to 3, V is a tetravalent metal cation,
v is a number of 0 to 1,
($A^{n-}$) is an acid anion with the charge n– where n is an integer of 1 to 3,
q is a number of 1 to 10,
with the proviso that x>a and e+2z+3d+4v=x+na, are subjected to alkali-induced ripening in aqueous medium. The alkali metal hydroxide content of the aqueous medium is adjusted to a value in the 1- to 6-molar range, the ripening temperature is adjusted to a value in the range from 60 to 100° C. and the ripening time is adjusted to a value in the range from 2.5 to 50 hours.

A particular advantage of the process according to the invention is that it can be carried out in the absence of pressure in an open reactor. This is particularly economical from the point of view of process technology. In particular, it is pointed out in this connection that the process according to the invention does not require hydrothermal conditions (i.e. temperatures above 100° C. and pressures above 1 atmosphere).

In one embodiment, layer compounds corresponding to general formula (I) where v=0 are used to carry out the process according to the invention. Accordingly, these layer compounds may be represented by the general formula (I*):

$$[E_e Z_z D_d (OH^-)_x](A^{n-})_a \cdot qH_2O \qquad (I^*)$$

in which
E is a monovalent cation from the group of alkali metals,
e is a number of 0 to 2,
Z is a divalent metal cation,
z is a number of 0 to 6,
D is a trivalent metal cation,
d is a number of 0 to 3,
($A^{n-}$) is an acid anion with the charge n– where n is an integer of 1 to 3,
q is a number of 1 to 10,
with the proviso that x>a and e+2z+3d=x+na.

In another embodiment, layer compounds corresponding to general formula (I) where e=0 are used to carry out the process according to the invention. Accordingly, these layer compounds may be represented by the general formula (I**):

$$[Z_z D_d V_v (OH^-)_x](A^{n-})_a \cdot qH_2O \qquad (I^{**})$$

in which
Z is a divalent metal cation,
z is a number of 0 to 6,
D is a trivalent metal cation,
d is a number of 0 to 3,
V is a tetravalent metal cation,
v is a number of 0 to 1,
($A^{n-}$) is an acid anion with the charge n– where n is an integer of 1 to 3,
q is a number of 1 to 10,
with the proviso that x>a and 2z+3d+4v=x+na.

In one preferred embodiment, layer compounds corresponding to general formula (I) where e and v are both 0 are used to carry out the process according to the invention. Accordingly, these layer compounds may be represented by the general formula (I***):

$$[Z_z D_d (OH^-)_x](A^{n-})_a \cdot qH_2O \qquad (I^{***})$$

in which

Z is a divalent metal cation,
z is a number of 0 to 6,
D is a trivalent metal cation,
d is a number of 0 to 3,
($A^{n-}$) is an acid anion with the charge n– where n is an integer of 1 to 3,
q is a number of 1 to 10,
with the proviso that x>a and 2z+3d=x+na.

The layer compounds corresponding to formula (I*) are "raditional" hydrotalcites which have been known to the expert for some time. Of these hydrotalcites, those in which D is aluminium, d is the number 1 and z is a number of 1 to 5 are preferred. These special hydrotalcites are characterized by the general formula (I**):

$$[Z_z Al(OH^-)_x](A^{n-})_a \cdot qH_2O \qquad (I^{****})$$

in which
Z is a divalent metal cation,
z is a number of 1 to 5,
($A^{n-}$) is an acid anion with the charge n– where n is an integer of 1 to 3 and
q is a number of 1 to 10,
with the proviso that x>a and 2z+3=x+na.

The essence of the invention is that the lattice structure of cationic layer compounds (I)—more particularly conventional hydrotalcites corresponding to general formulae (I*) and (I**)—undergoes an alkali-induced modification such that, on the one hand, the crystallinity of the layer compound is improved and, on the other hand, the effect of the resulting layer compounds as co-stabilizers for halogen-containing plastics is lastingly improved. The origin of the layer compound (I) used is not critical. It may be of natural origin or may be synthetically produced. In the case of synthetic layer compounds (I), it does not matter whether the compound is used as a solid or whether it was prepared in situ immediately before the alkali-induced ripening and, hence, is present in the form of an aqueous suspension.

The ripening medium is a 1- to 6-molar aqueous alkali metal hydroxide solution. However, 3- to 5-molar solutions are preferably used. Basically, the type of alkali metal hydroxide used to prepare the aqueous alkaline medium is not critical. However, sodium hydroxide is generally used.

The ripening temperature is a temperature in the range from 60 to 100° C. and preferably in the range from 70 to 90° C.

Basically, the ripening time is in the range from 2.5 to 100 hours. If it is below the lower limit of this range, the desired improvement in the action spectrum of the layer compounds is not guaranteed. If it exceeds the upper limit mentioned, any further improvement in the action spectnrun is very limited so that exceeding this upper limit is uneconomical. Preferred crystallization times are in the range from 10 to 20 hours.

The cationic layer compounds (I) are compounds known per se of which the structure and preparation are described, for example, by W. T. Reichle in Chemtec (January 1986), pages 58 to 63. The prototype of cationic layer compounds is the mineral hydrotalcite [$Mg_6 Al_2 (OH)_{16}$]($CO_3$)$\cdot 4H_2O$. Structurally, hydrotalcite derives from brucite [$Mg(OH)_2$]. Brucite crystallizes in a layer structure with the metal ions in octahedral vacancies between two layers of hexagonally close-packed ($OH^-$) ions. Only every second layer of the octahedral vacancies is occupied by metal ions M so that layer packages (OH)—M—(OH) are formed. In brucite, the interlayers are empty. In hydrotalcite, some of the Mg(II)

ions—say every second to fifth—are statistically replaced by Al(III) ions. Overall, the layer package thus receives a positive charge. This charge is equalized by anions which are present in the interlayers together with readily removable water of crystallization. Scheme 1 below diagrammatically illustrates the layer structure of hydrotalcite:

| Cationic layer | OH$^-$ |
| | Mg$^{2+}$  Al$^{3+}$ |
| | OH$^-$ |
| Interlayer | (CO$_3$)$^{2-}$  H$_2$O |
| Cationic layer | OH$^-$ |
| | Mg$^{2+}$  Al$^{3+}$ |
| | OH$^-$ |

SCHEME 1

Hydrotalcites form powders with BET surfaces of up to about 150 m$^2$/g which have a talcum-like feel. Two basic syntheses are known from the literature. The first comprises treating aqueous solutions of the corresponding metal salts with lye, the hydrotalcite formed precipitating. The second synthesis starts out from water-insoluble starting compounds, such as metal oxides and hydroxides. The reactions involved are heterogeneous reactions which are normally carried out in an autoclave.

As already mentioned, hydrotalcite is merely the prototype of cationic layer compounds. However, the synthesis methods known from hydrotalcite are also generally used for the synthesis of cationic layer compounds. As known to the expert, these synthesis methods may be classified quite generally as hydrothermal syntheses. Hydrothermal synthesis in the narrower sense is the synthesis of minerals from highly heated (>100° C./1 atm.) aqueous suspensions. Hydrothermal syntheses are generally carried out in pressure vessels because the temperatures applied are far above the boiling point of water and, in most cases, even above its critical temperature (cf. Römpps Chemie-Lexikon, $^7$1973, p. 1539).

Cationic layer compounds (I) in which Z represents at least one divalent metal ion selected from the group consisting of magnesium, calcium and zinc are preferred for the purposes of the invention. In a preferred embodiment, Z represents exactly one divalent metal ion from the group mentioned, more particularly magnesium. Cationic layer compounds corresponding to general formula I, in which A$^{n-}$ represents an acid anion having a charge of (n–) selected from the group of anions consisting of carbonate, hydrogen carbonate, perchlorate, acetate, nitrate, tartrate, oxalate and iodide, preferably carbonate, are most particularly preferred. Where reference is made to at least one divalent metal ion in the explanation of formula I above, it means that different divalent metal ions may also be present alongside one another in the cationic layer compound. The indices x, y and z and m may represent whole or broken numbers within the limits mentioned. Cationic layer compounds corresponding to general formula I, in which Z represents magnesium and Al represents carbonate, are particularly advantageous.

Basically, the BET surface of the cationic layer compounds (I) to be used in accordance with the invention is not critical. However, layer compounds (I) with a BET surface above 50 m$^2$/g are preferably used. A preferred embodiment of the invention is characterized by the use of layer compounds (I) with an average particle size of 20 to 50 µm.

Examples of suitable cationic layer compounds are synthetic hydrotalcites which are also known as basic aluminium/magnesium carbonates and which are generally produced by the process described in DE-B-15 92 126 and by the processes described in DE-A-20 61 114 or DE-A 29 05 256.

Suitable sources of divalent metal ions are their carbonates, hydroxocarbonates, hydroxides, oxides or their water-soluble salts, for example nitrates, chlorides, sulfates or perchlorates. Sources of divalent metal ions which already contain the anion A$^{n-}$ are particularly preferred. In this case, there is no need to add an additional source of these anions. For example, it is particularly preferred to use at least part of the divalent metal ions as carbonates or as hydroxocarbonates. If only the oxides or hydroxides are used as the source of divalent metal ions, an additional source of the anions A$^{n-}$, for example in the form of alkali metal salts, has to be used. Alkali metal salts of carbonic acid and/or of oxo acids of halogens, for example perchloric acid, are preferred and may be added to the reaction mixture in quantities of 1 to 100 mole-%, based on the aluminium content. For example, sodium carbonate may be added to the reaction mixture.

Both fine-particle active aluminium(III) hydroxide in combination with sodium hydroxide and NaAlO$_2$ may be used as the aluminium source. Aluminium chloride, bromide, nitrate and sulfate may also be used.

The present invention also relates to cationic layer compounds obtainable by subjecting layer compounds corresponding to general formula (I)

in which

E is a monovalent cation from the group of alkali metals, e is a number of 0 to 2, Z is a divalent metal cation, z is a number of 0 to 6, D is a trivalent metal cation, d is a number of 0 to 3, V is a tetravalent metal cation, v is a number of 0 to 1, (A$^{n-}$) is an acid anion with the charge n– where n is an integer of 1 to 3, q is a number of 1 to 10, with the proviso that x>a and e+2z+3d+4v=x+na, to alkali-induced ripening in aqueous medium, the alkali metal hydroxide content of the aqueous medium being adjusted to a value in the 1- to 6-molar range, the crystallization temperature being adjusted to a value in the range from 60 to 100° C. and the crystallization time being adjusted to a value in the range from 2.5 to 50 hours.

The present invention also relates to compositions for stabilizing halogen-containing plastics against thermal or photochemical degradation containing cationic layer compounds obtainable by subjecting layer compounds corresponding to general formula (I):

in which

E is a monovalent cation from the group of alkali metals, e is a number of 0 to 2, Z is a divalent metal cation, z is a number of 0 to 6, D is a trivalent metal cation, d is a number of 0 to 3, V is a tetravalent metal cation, v is a number of 0 to 1, ($A^{n-}$) is an acid anion with the charge n− where n is an integer of 1 to 3, q is a number of 1 to 10, with the proviso that x>a and e+2z+3d+4v=x+na, to alkali-induced ripening in aqueous medium, the alkali metal hydroxide content of the aqueous medium being adjusted to a value in the 1- to 6-molar range, the crystallization temperature being adjusted to a value in the range from 60 to 100° C. and the crystallization time being adjusted to a value in the range from 2.5 to 50 hours.

The substances produced in accordance with the invention may advantageously be used as stabilizers for halogen-containing thermoplastic resins. Examples of such resins are PVC, polyvinylidene chloride, chlorinated or chlorosulfonated polyethylene, chlorinated polypropylene or chlorinated ethylene/vinyl acetate copolymers. The cationic layer lattice compounds produced in accordance with the invention are particularly suitable as stabilizers for resins of the PVC type, i.e. on the one hand vinyl chloride homopolymers and, on the other hand, copolymers of vinyl chloride with other monomers.

Accordingly, the present invention also relates to the use of cationic layer compounds obtainable by subjecting layer compounds corresponding to general formula (I):

$$[E_e Z_z D_d V_v(OH^-)_x](A^{n-})_a \cdot qH_2O \qquad (I)$$

in which

E is a monovalent cation from the group of alkali metals, e is a number of 0 to 2, Z is a divalent metal cation, z is a number of 0 to 6, D is a trivalent metal cation, d is a number of 0 to 3, V is a tetravalent metal cation, v is a number of 0 to 1, ($A^{n-}$) is an acid anion with the charge n− where n is an integer of 1 to 3, q is a number of 1 to 10, with the proviso that x>a and e+2z +3d+4v=x+na, to alkali-induced ripening in aqueous medium, the alkali metal hydroxide content of the aqueous medium being adjusted to a value in the 1- to 6-molar range, the crystallization temperature being adjusted to a value in the range from 60 to 100° C. and the crystallization time being adjusted to a value in the range from 2.5 to 50 hours, for stabilizing halogen-containing plastics against thermal or photochemical degradation.

The cationic layer compounds produced in accordance with the invention are preferably used as co-stabilizers for halogen-containing plastics stabilized with calcium and/or zinc salts of carboxylic acids containing 6 to 22 carbon atoms. More particularly, the cationic layer compounds produced in accordance with the invention are used as co-stabilizers in polyvinyl chloride. To this end, the cationic layer compounds are added in quantities of 0.01 to 5 parts by weight and preferably 0.1 to 3 parts by weight per 100 parts by weight of synthetic resins disregarding any organic additives which may be present. In general, they are mechanically mixed with the plastics present in granular form before molding, for example by calendering and extrusion. Commercial zinc and/or calcium salts of carboxylic acids containing 6 to 22 carbon atoms are incorporated as conventional stabilizers, generally at the same time as the cationic layer compounds. Other conventional additives, such as the heat stabilizers described in European patent application EP-A-189 899, may of course also be used. The quantities in which the stabilizers and co-stabilizers are used may vary as required, with the proviso that the total quantity of stabilizer added is within the limits of 0.5 to 5 parts by weight per 100 parts by weight of synthetic resin. Accordingly, the minimum quantity of cationic layer compound is at least 0.01% by weight.

The effect of zinc and/or calcium soaps as stabilizers for halogen-containing plastics is enhanced by the use of the cationic layer compounds according to the invention. In addition, the cationic layer compounds as co-stabilizers may readily be incorporated in the halogen-containing plastics without adversely affecting their rheological properties.

If desired, the cationic layer compounds produced in accordance with the invention may be subsequently modified with at least one liquid or low-melting dispersing additive selected from compounds belonging to groups A) to F) identified below by intensive mixing at room temperature (15 or 25° C.) or at a temperature below the decomposition temperatures of the cationic layer compounds and/or the additives, preferably below 300° C. Additive groups A) to F) are:

A) polyols containing 3 to 30 carbon atoms and at least two hydroxyl groups,

B) esters of partly or completely epoxidized unsaturated carboxylic acids containing 6 to 22 carbon atoms, C) full and partial esters of polyols containing 3 to 30 carbon atoms and 2 to 12 hydroxyl groups with carboxylic acids containing 6 to 22 carbon atoms, D) alkyl and aryl phosphites, E) anions of saturated or unsaturated fatty acids containing 6 to 22 carbon atoms, F) polymers with a molecular weight of 500 to 50,000 which are soluble in water with pH values above 8.

Suitable group A) additives are polyols containing at least two hydroxyl groups and a total of 3 to 30 carbon atoms. Examples of such polyols are diols containing 3 to 30 carbon atoms, such as butanediols, hexanediols, dodecanediols, and polyols, such as trimethylol propane, pentaerythritol, glycerol and technical oligomer mixtures thereof with average degrees of condensation of 2 to 10. Most particularly preferred group A) additives are polyols containing 3 to 30 carbon atoms of which the carbon skeleton bears at least one hydroxyl group or one ether oxygen every 3 carbon atoms, preferably glycerol and/or technical oligoglycerol mixtures with average degrees of condensation of 2 to 10. The tris-(2-hydroxyethyl)-isocyanurate known as "THEIC" (EP-B 377 428) is also particularly suitable for use as such an additive.

The group B) additives are esters of partly or completely epoxidized unsaturated carboxylic acids containing 6 to 22 carbon atoms. Suitable esters are esters of mono-, di- and/or trihydric alcohols which are completely esterified with epoxidized unsaturated carboxylic acids containing 6 to 22 carbon atoms, such as methyl, 2-ethylhexyl, ethylene glycol, butanediol, neopentyl glycol, glycerol and/or trimethylol propane esters of epoxidized lauroleic acid, palmitoleic acid, oleic acid, ricinoleic acid, linoleic acid and/or linolenic acid. Esters of trihydric alcohols and completely epoxidized unsaturated carboxylic acids containing 12 to 22 carbon atoms are preferred, esters of glycerol with completely epoxidized unsaturated carboxylic acids containing 12 to 22 carbon atoms being particularly preferred. The carboxylic acid component may be derived, for example, from palmitoleic acid, oleic acid, elaidic acid, petroselic acid, ricinoleic acid, linolenic acid, gadoleic acid or erucic acid. The unsaturated carboxylic acids are epoxidized by known methods. As usual in oleochemistry, the epoxidized carboxylic acid glycerides may also be the technical mixtures obtained by epoxidation of natural unsaturated fats and oils. Epoxidized rapeseed oil, epoxidized unsaturated soybean oil and/or epoxidized sunflower oil from new plants is/are preferably used.

The group C) additives are full or partial esters which may be obtained by the relevant methods of preparative organic chemistry, for example by acid-catalyzed reaction of polyols with carboxylic acids. The polyol component may be selected from those already discussed in relation to group A). Preferred acid components are aliphatic, saturated and/or unsaturated carboxylic acids containing 6 to 22 carbon atoms, such as caproic acid, caprylic acid, capric acid, lauric acid, myristic acid, palmitic acid, palmitoleic acid, stearic acid, oleic acid, ricinoleic acid, linoleic acid, linolenic acid, behenic acid or erucic acid. As usual in oleochemistry, the carboxylic acid component may even be a technical mixture of the type accumulating in the pressure hydrolysis of natural fats and oils. Partial esters of glycerol and, in particular, technical oligoglycerol mixtures with average degrees of condensation of 2 to 10 and saturated and/or unsaturated aliphatic carboxylic acids containing 6 to 22 carbon atoms are preferred.

Suitable group D) additives are alkyl and aryl phosphites, preferably those corresponding to general formula (II):

(II)

in which $R^1$, $R^2$ and $R^3$ independently of one another represent an alkyl group containing 1 to 18 carbon atoms or a phenyl group. Typical examples of group D) additives are tributyl phosphite, triphenyl phosphite, dimethyl phenyl phosphite and/or dimethyl stearyl phosphite. Diphenyl decyl phosphite is preferred.

Suitable group E) additives are anions of saturated or mono- or polyunsaturated fatty acids containing 6 to 22 carbon atoms which may be linear or branched. Linear fatty acids are preferred by virtue of their easier accessibility. Pure fatty acids, for example lauric acid, myristic acid, palmitic acid, stearic acid, lauroleic acid, myristoleic acid, palmitoleic acid, oleic acid, linoleic acid or linolenic acid, are suitable. However, it is also economically attractive to use fatty acid mixtures of the type obtainable from the hydrolysis of natural oils and fats. It does not matter whether the fatty acids are used as such or in the form of preferably water-soluble salts, for example sodium or potassium salts. Since the reaction mixture is highly alkaline, the reaction product will contain the fatty acids in any event in the form of their anions.

Additives of group F) are polymers with an average (number average) molecular weight of 500 to 50,000 which are soluble in water with pH values above 8 and preferably with pH values of 9 to 12. In the present context, "soluble" means that more than 0.01% by weight of the polymeric additives and preferably at least 0.1% by weight is dissolved completely clearly, above all under the described conditions, in an aqueous solution with a pH value of 10 adjusted with alkali metal hydroxides at 20° C. In principle, any polymers known to the expert as pigment dispersants (cf. Kirk-Othmer "Encyclopedia of Chemical Technology", Vol. 7, 3rd Edition, 1979, pages 840–841 or Ullmann's "Encyclopedia of Industrial Chemistry", Vol. A8, 5th Edition, 1987, pages 586–601) may be used as polymeric additives providing they meet the solubility and molecular weight requirements. Acrylic acid and methacrylic acid homopolymers and copolymers, lignin sulfonates and trimer fatty acids are preferred polymeric additives. Particularly suitable polymeric additives are those selected from the group of polymers of acrylic acid and methacrylic acid and copolymers thereof with unsaturated monomers containing sulfonic acid groups, unsaturated monomers containing phosphonic acid groups, unsaturated aliphatic carboxylic acids containing 3 to 5 carbon atoms, amides of unsaturated aliphatic carboxylic acids containing 3 to 5 carbon atoms, unsaturated monomers containing amino groups and/or salts thereof, vinyl acetate, vinyl chloride, acrylonitrile, vinylidene chloride, 1,3butadiene, styrene, alkyl styrenes containing 1 to 4 carbon atoms in the alkyl group. Examples of such polymeric additives are polyacrylic acid, polymethacrylic acid (acrylic acid and methacrylic acid and derivatives thereof are hereinafter referred to in short as (meth)acrylic acid or derivatives) and/or salts thereof, such as polysodium (meth) acrylate, copolymers of (meth)acrylic acid with maleic acid, maleic anhydride, styrene sulfonic acid, α-methyl styrene, 2-vinyl pyridine, 1-vinyl imidazole, dimethyl aminopropyl (meth)-acrylamide, 2-(meth)acrylamido-2-methyl propane sulfonic acid, (meth)acryl-amide, N-hydroxydimethyl (meth)acrylamide and/or salts thereof. Among the polymeric additives, those which are predominantly anionic in character, i.e. which contain mostly acid groups either in free form or in the form of their salts, are most particularly preferred. Polymers of (meth)acrylic acid and copolymers thereof with styrene, alkyl styrenes containing 1 to 4 carbon atoms in the alkyl group, styrene sulfonic acid, maleic acid andlor salts thereof, particularly sodium salts, and maleic anhydride are particularly preferred. The polymeric additives preferably have a molecular weight of 1,000 to 10,000. The polymeric additives may be produced by known methods, such as bulk or solution polymerization (cf. Ullmann's Encyclopädie der technischen Chemie, Vol. 19, 4th Edition, pages 2–11, 1980). Processes for the production of lignin sulfonic acid and salts thereof are also described in Ullmann's Encyclopädie der technischen Chemie, Vol. 16, 4th Edition, pages 254–257, 1978). Trimer fatty acids are commercially available products which are obtained as residues in the distillation of dimer fatty acid, such as Pripol® 1040 of Unichema or Emery® 1000 of Emery.

In the context of the invention, low-melting additives of groups A) to F) are understood to be additives which can be converted into the liquid state at temperatures below the decomposition temperatures mentioned above and at normal pressure. Instead of intensive mixing, the cationic layer compounds obtained after the production process may if desired be subsequently ground with one or more additives selected from groups A) to F) in the presence of polar organic solvents or water, preferably in grinding mills and, more particularly, in a ball mill, dried and optionally post-dried. In the context of the invention, polar organic solvents are understood to be hydrocarbon compounds containing at least one substituent more electronegative than carbon which are liquid at room temperature (15 to 25° C.). Corresponding hydrocarbon compounds include chlorinated hydrocarbons, alcohols, ketones, esters, ethers and/or glycol ethers. Suitable polar organic solvents are methanol, ethanol, n-butanol, acetone, methyl ethyl ketone, methyl isobutyl ketone, cyclohexanol, isophorone, ethyl acetate, lactic acid ethyl ester, 2-methoxyethyl acetate, tetrahydrofuran, ethylene glycol monomethyl ether, diethylene glycol monoethyl ether. For this subsequent modification, i.e. modification after drying of the cationic layer compounds produced in accordance with the invention to form a powder, the organic additives may be used in quantities of about 5 to about 100% by weight, based on the cationic layer compound.

The use of the additives A) to F) in connection with cationic layer compounds is known from WO 92/06135, WO 92/20732 and WO 92/20619.

The cationic layer lattice compounds produced in accordance with the invention may be used as sole stabilizers for halogen-containing thermoplastic resins. However, they are preferably used in combination with other stabilizers. Besides the metal soaps already mentioned, suitable co-stabilizers are, above all, 1,3-diketone compounds, organic esters of phosphorous acid, polyols and amino acids.

Examples of 1,3-diketone compounds are: dibenzoyl methane, stearoyl benzoyl methane, palmitoyl benzoyl methane, myristoyl benzyl methane, lauroyl benzoyl methane, benzoyl acetone, acetyl acetone, tribenzoyl methane, diacetyl acetobenzene, p-methoxy and stearoyl acetophenone, acetoacetic ester.

Examples of suitable esters of phosphorous acid are triaryl phosphites, such as triphenyl phosphite, tris-(p-nonylphenyl)-phosphite (TNPP); alkylaryl phosphites, such as monoalkyl diphenyl phosphites, for example diphenyl isooctyl phosphite, diphenyl isodecyl phosphite and dialkyl monophenyl phosphites, such as phenyl diisooctyl phosphite, phenyl diisodecyl phosphite, and trialkyl phosphites, such as triisooctyl phosphite and tristearyl phosphite.

Examples of suitable polyols are trimethylol propane, di(trimethylolpropane), erythritol, pentaerythritol, dipentaerythritol, sorbitol, mannitol.

Examples of amino acid derivatives are glycine, alanine, lysine, tryptophane, acetyl methionine, pyrrolidonecarboxylic acid, β-aminocrotonic acid, α-aminoacrylic acid, α-aminoadipic acid and esters derived therefrom. The alcohol components of these esters include monohydric alcohols, such as methanol, ethanol, propanol, isopropanol, butanol, 2-ethyl hexanol, octanol, iso-octanol, lauryl alcohol, stearyl alcohol, and polyols, such as ethylene glycol, propylene glycol, 1,3-butanediol, 1,4-butanediol, glycerol, diglycerol, trimethylolpropane, pentaerythritol, dipentaerythritol, sorbitol and mannitol.

Examples of suitable epoxy compounds are epoxidized soybean oil, epoxidized rapeseed oil, epoxidized esters of unsaturated fatty acids, such as epoxymethyl oleate, epoxybutyl oleate, epoxidized alicyclic substances, glycidyl ethers, such as bisphenol A diglycidyl ether, bisphenol F diglycidyl ether, glycidyl esters, such as glycidyl acrylate and glycidyl methacrylate.

The following Examples are intended to illustrate the invention without limiting it in any way.

EXAMPLES

A) Production of the Cationic Layer Compounds

Example 1

Materials

Solution A 10.128 kg $AlCl_3.6H_2O$ (42.0 moles), 10.212 kg $MgCl_2.6H_2O$ (50.4 moles) and 1.680 kg $ZnCl_2$ (12.0 moles) are dissolved in 42 l of deionized water with gentle heating (volume of the solution: ca. 56 l).

Suspension B 4.452 kg of $Na_2CO_3$ (42.0 moles) are dissolved in 21 l of deionized water and 20.04 kg of 50% NaOH (249.6 moles) are added to the resulting solution. Addition of the NaOH resulted in partial precipitation (volume of the suspension: ca. 36 l).

Method

Solution A was added to suspension B over a period of 30 to 45 minutes with continuous stirring (800 to 1,100 r.p.m./ blade stirrer). The crude product precipitated as the viscosity increased, accompanied by a slight increase in temperature. It was filtered off in vacuo by means of a blue band filter and washed with 36 l of water. The filter cake was taken up in 84 l of a 4-molar aqueous NaOH (obtained from 17.6 l of 50% aqueous NaOH and 66.4 l of deionized water) and crystallized for 16 h with stirring at 80° C. (three-necked flask with condenser; stirrer rotating at 300 r.p.m.). The product was then filtered in vacuo by means of a blue band filter and thoroughly washed with water. Adhering water was then removed from the product in a vacuum drying cabinet at 110° C. 5.2 kg of dry product were obtained.

B) Performance tests

The substance of Example 1 produced in accordance with the invention was tested for color stability at elevated temperature in accordance with DIN 5033. The test was carried out at 180° C. using sheeted-out compounds as the test specimens. It was found that the long-term color stability of the test specimens containing the product produced in accordance with Example 1 as stabilizer was better than the long-term stability of corresponding test specimens containing commercial stabilizers, for example of the Alcamizer type (type 4, a product of Kyowa). Blackening of the test specimens only occurred after a test duration of 180 minutes (for comparison: the test specimen containing Alcamizer 4 turned black after only 150 minutes).

The following test formulation was used for the tests according to DIN 5033:

| | |
|---|---|
| PVC (Solvic 268; Solvay) | 100.0 parts |
| Ca stearate | 0.5 part |
| Zn stearate | 0.5 part |
| Rhodiastab 50 (Rhône Poulenc) | 0.2 part |
| Test substance[a)] | 1.0 part | a)Invention: substance of Example 1
Comparison: Alcamizer 4

The test specimens were produced by homogenizing and plasticizing the PVC and the additives mentioned for 5 mins. at 170° C. on laboratory mixing rolls. 15 mm wide test strips were cut out from the ca. 0.5 mm thick sheets obtained and were treated in a thermo-oven at 180° C. The test strips were removed from the oven at 15-minute intervals until blackening was observed.

What is claimed is:

1. A process for preparing a modified cationic layer compound, said process comprising: subjecting a starting compound of the general formula (I):

$$[E_eZ_zD_dV_v(OH^-)_x](A^{n-})_a \cdot qH_2O \qquad (I)$$

to alkali-induced ripening in an aqueous medium for a period of from 2.5 to 50 hours at a temperature of from 60° C. to 100° C., wherein the aqueous medium has an alkali metal hydroxide molar concentration of from 1 to 6, wherein E represents at least one monovalent alkali metal cation, e represents a number of from 0 to 2, Z represents at least one divalent metal cation, z represents a number of from 0 to 6, D represents at least one trivalent metal cation, d represents a number of from 0 to 3, V represents at least one tetravalent metal cation, v represents a number of from 0 to 1, $(A^{n-})$ represents an acid anion having a charge n−, and wherein n represents an integer of from 1 to 3, q represents a number of from 1 to 10, x is greater than a, and e+2z+3d+4v=x+na.

2. The process according to claim 1 wherein v has the value zero.

3. The process according to claim 1 wherein e has the value zero.

4. The process according to claim 1 wherein v and e have the value zero.

5. The process according to claim 1 wherein e and v have the value zero, d has the value one, D stands for aluminum and x is a number of 1 to 5.

6. A process for stabilizing a halogen-containing plastic against thermal and/or photochemical degradation, said process comprising:

(a) providing a halogen-ontaining plastic composition;

(b) providing a modified cationic layer compound; and (d) combining the halogen-containing plastic composition and ine modified cationic layer compound;

wherein the modified cationic layer compound is prepared by subjecting a starting compound of the general formula (I):

$$[E_eZ_zD_dV_v(OH^-)_x](A^{n-})_a \cdot qH_2O \qquad (I)$$

to alkali-induced ripening in an aqueous medium for a period of from 2.5 to 50 hours at a temperature of from 60° C. to 100° C., wherein the aqueous medium has an alkali metal hydroxide molar concentration of from 1 to 6, wherein E represents at least one monovalent alkali metal cation, e represents a number of from 0 to 2, Z represents at least one divalent metal cation, z represents a number of from 0 to 6, D represents at least one trivalent metal cation, d represents a number of from 0 to 3 V represents at least one tetravalent metal cation, v represents a number of from 0 to 1, $(A^{n-})$ represents an acid anion having a charge n−, and wherein n represents an integer of from 1 to 3, q represents a number of from 1 to 10, x is greater than a, and e+2z+3d+4v=x+na.

7. The process according to claim 6 wherein v has the value zero.

8. The process according to claim 6 wherein e has the value zero.

9. The process according to claim 6 wherein v and e have the value zero.

10. The process according to claim 6 wherein e and v have the value zero, d has the value one, D stands for aluminum and x is a number of 1 to 5.

11. The process according to claim 6, wherein said halogen-containing plastic composition comprises at least one polyvinyl chloride selected from the group consisting of homopolymers and copolymers.

12. The process according to claim 6, further comprising: (c) providing a co-stabilizer selected from calcium and zinc salts of carboxylic acids containing 6 to 2 carbon atoms, wherein the co-stabilizer is combined with the halogen-containing plastic composition and the modified cationic layer compound.

13. The process according to claim 6, wherein the modified cationic layer compound is present in an amount of from 0.01 to 5 parts by weight, based on the weight of the halogen-containing plastic compositions.

14. A composition comprising a modified cationic layer compound prepared by subjecting a starting compound of the general formula (I):

$$[E_eZ_zD_dV_v(OH^-)_x](A^{n-})_a \cdot qH_2O \qquad (I)$$

to alkali-induced ripening in an aqueous medium for a period of from 2.5 to 50 hours at a temperature of from 60° C. to 100° C. wherein the aqueous medium has an alkali metal hydroxide molar concentration of from 1 to 6, wherein E represents at least one monovalent alkali metal cation, e represents a number of from 0 to 2, Z represents at least one divalent metal cation, z represents a number of from 0 to 6, D represents at least one trivalent metal cation, d represents a number of from 0 to 3, V represents at least one tetravalent metal cation, v represents a number of from 0 to 1, $(A^{n-})$ represents an acid anion having a charge n−, and wherein n represents an integer of from 1 to 3, q represents a number of from 1 to 10, x is greater than a, and e+2z+3d+4v=x+na.

15. The composition according to claim 14, wherein v has a value of zero.

16. The composition according to claim 14, wherein e has a value of zero.

17. The composition according to claim 14, wherein V and e each have a value of zero.

18. The composition according to claim 14, wherein v and e each have a value of zero, d has a value of 1, D represent aluminum, and x has a value of from 1 to 5.

19. The composition according to claim 14, wherein the acid anion is selected from the group consisting of carbonate, hydrogen carbonate, perchlorate, acetate, nitrate, tartrate, oxolate, and iodide.

* * * * *